July 4, 1961
F. L. POST
2,991,468
SENSITIVITY-CONTROL-CIRCUITS FOR RADAR SYSTEMS AND THE LIKE
Filed Dec. 1, 1955
2 Sheets-Sheet 1
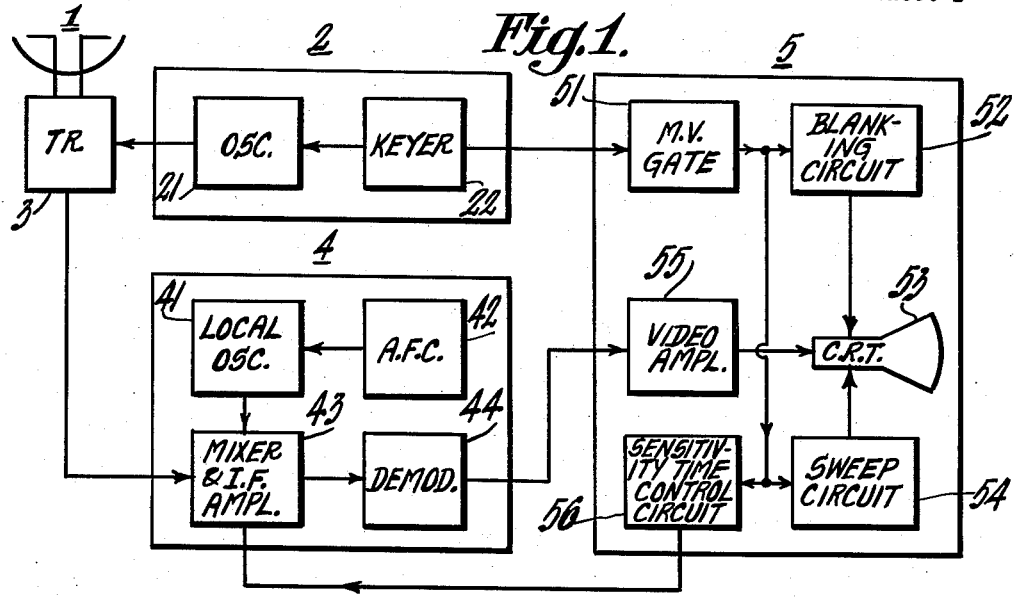
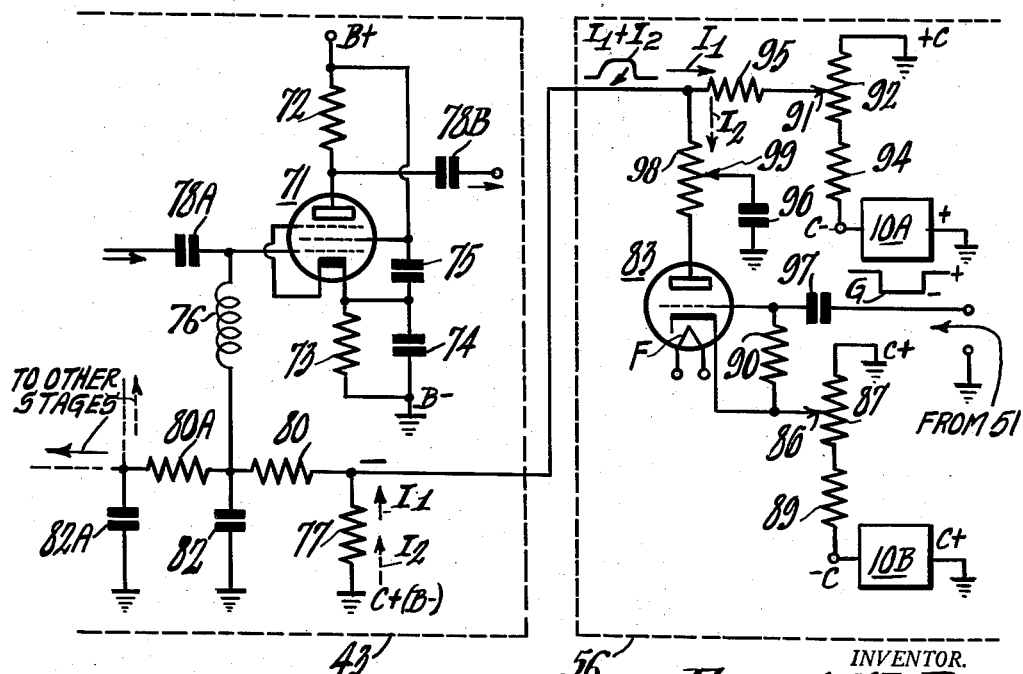
INVENTOR.
*Frederick L. Post*
BY
*Floyd M. Harris*
ATTORNEY

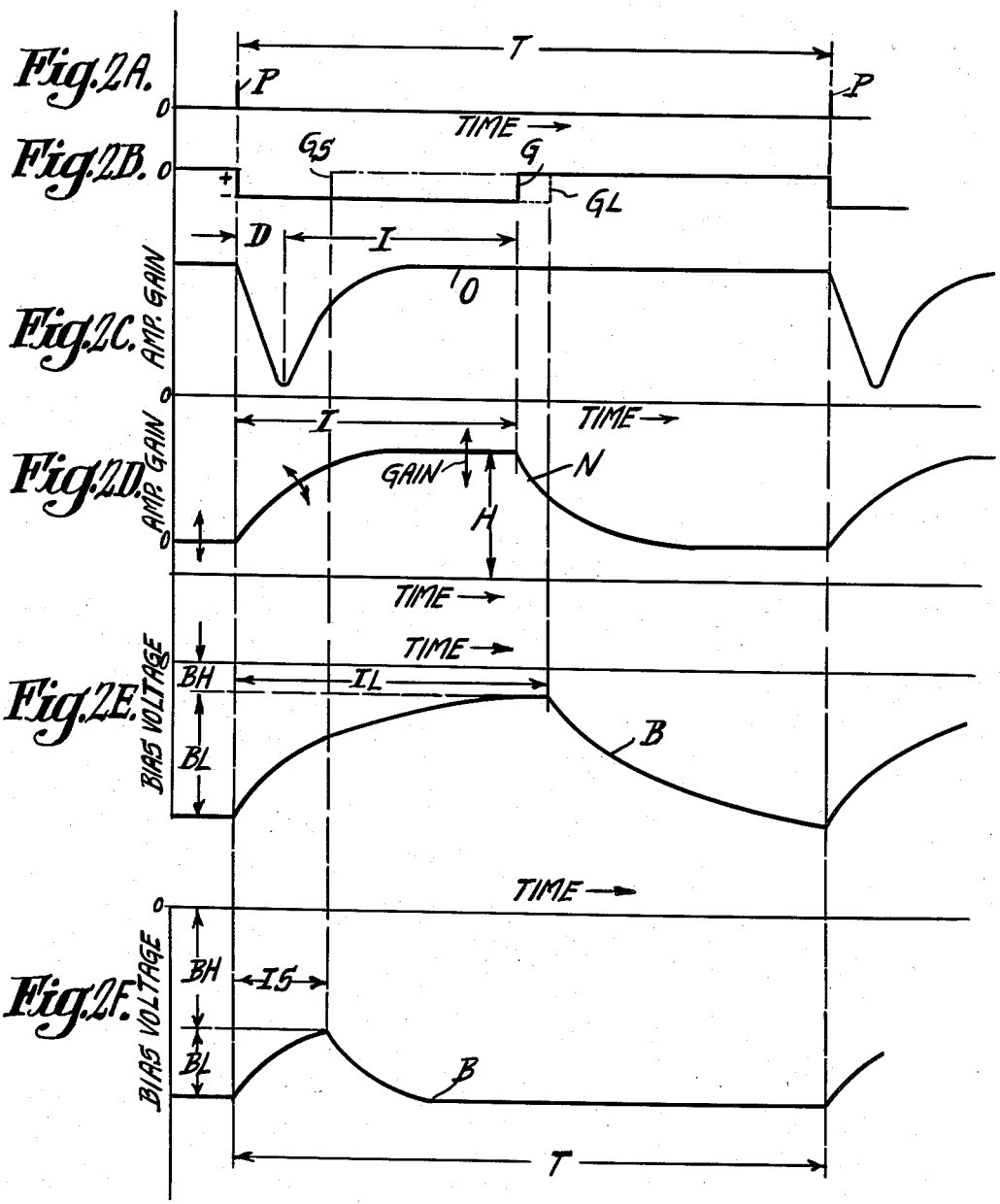

United States Patent Office 2,991,468
Patented July 4, 1961

2,991,468
SENSITIVITY-CONTROL-CIRCUITS FOR RADAR SYSTEMS AND THE LIKE
Frederick L. Post, Poughkeepsie, N.Y., assignor to Radio Corporation of America, a corporation of Delaware
Filed Dec. 1, 1955, Ser. No. 550,427
8 Claims. (Cl. 343—17.1)

This invention relates to circuits for controlling the sensitivity of amplifiers of the type used for example in the receivers of radar systems.

In radar systems of the pulsed type, a transmitter emits a series of short pulses of electromagnetic energy which are radiated from an antenna system. In the intervals between pulses, echoes from objects in the path of the radiated energy are detected by the radar receiver and are visually presented by an associated cathode-ray tube. The need to control the receiver sensitivity in avoidance of overloading by strong echoes from nearby objects has previously been recognized but the sensitivity-time-control (STC) circuits heretofore used have undesirable shortcomings. For example, with them upon emission of a radiated pulse, the receiver gain is first reduced from a high level suited for reception of echoes from remote objects and then permitted to return to that high level at which it remains until emission of the next pulse. With such prior STC circuits, the strong echoes from the nearest objects are received while the receiver gain is still high, although being reduced. Consequently the receiver is overloaded by these strong echoes and there is little or no resolution of nearby objects in the indicator tube presentation. Furthermore, with such prior circuits, upon failure of the control tube, the radar system becomes inoperative for display of echoes until the faulty control tube is replaced.

With the STC circuits of the present invention, the receiver gain is at a preset minimum level until approximately the time a pulse is being radiated, whereupon the receiver gain immediately begins to increase exponentially at a preset rate toward a preset maximum from which it is returned to the preset minimum level before the next radiated pulse. Thus, reflections from nearby objects are resolved in the indicator tube display with the receiver gain progressively increasing from the very beginning of each sweep cycle of the indicator tube for optimum presentation of echoes from increasingly distant objects.

More particularly, the receiver sensitivity is determined by a bias having two components: one of which is periodically applied through a control tube under control of gating pulses to predetermine the minimum sensitivity of the receiver; and the other of which is continuously applied to predetermine the maximum sensitivity of the receiver and to insure its continued operation for display of echo signals in event of failure of the control tube.

Preferably, and more specifically, the two bias components provided by the STC circuit are independently adjustable to pre-select minimum and maximum sensitivity levels suited for the radar range to be used and the pre-selection of the rate of change of sensitivity between these levels is effected by adjustment of the time-constant of a resistance-reactance network included in the STC circuit.

The invention further resides in sensitivity-time-control circuits having features of combination and arrangement hereinafter described and claimed.

For a more detailed understanding of the invention, reference is hereinafter made to the accompanying drawings in which:

FIGURE 1 is a block diagram of a radar system;
FIGURES 2A–2F are explanatory figures referred to in discussion of the operation of FIGURES 1 and 3; and FIGURE 3 schematically illustrates a preferred embodiment of the improved STC circuit.

For general description of a radar system suited for inclusion of the present invention, reference is made to FIGURE 1 which in block diagram shows the principal components and subcomponents of such a system.

The transmitter 2 includes oscillator 21, usually a magnetron or other microwave generator, which is periodically keyed by modulator 22 to generate short pulses of electromagnetic energy which are radiated from antenna 1. The pulse-energy echoes reflected back from objects in the propagation path and picked up by antenna 1 in the interval between successively radiated pulses are routed to receiver 4 by device 3 known at a TR box.

The receiver 4 is of the superheterodyne type having a local oscillator 41 stabilized by an automatic frequency control 42 at a frequency differing from that of transmitter oscillator 21 by a suitable intermediate frequency. In the converter-amplifier section 43 of the receiver, the echo signals are beat against the locally generated oscillations and the resulting intermediate-frequency signals are demodulated by the output section 44 of the receiver. The resulting signal pulses after amplification by broadband amplifier 55 of indicator 5 are applied to the cathode-ray tube 53 in known manner suited for the type of echo presentation desired. For example, for the PPI type of presentation using a continuously rotating antenna, the signals are applied to control the intensity of the cathode-ray spot as it is swept radially of the tube face under control of the sweep generator section 54. Successive radial sweeps are angularly spaced to correspond with successive azimuthal positions of the antenna by known deflection-control means. For the type A presentation of objects for a given azimuth position of the antenna, the signals are applied vertically to deflect the cathode-ray spot as it is swept horizontally of the tube face under control of sweep generator section 54.

For these or other types of presentation of the echo signals, each sweep cycle of the cathode-ray spot is initiated by multivibrator section 51 of indicator 5. The return trace of the spot is visually suppressed by the blanker section 52 of the indicator 5. The multivibrator 51 is triggered by a pulse from the modulator 22 of transmitter 2 to produce a gating signal which as applied to blanker 52 permits the cathode-ray spot to be visible and which as applied to the sweep section 54 initiates a sweep cycle of the spot.

In the system as thus far described, with the sensitivity of receiver-amplifier section 43 sufficiently high for display of echoes from remote objects, the receiver is heavily overloaded by echoes from nearby objects and there is no resolution of such nearby objects in the resulting bright patch displayed by indicator tube 53. With the receiver gain sufficiently reduced to resolve signals from nearby objects, the signals from remote objects are insufficiently amplified to be distinguishable in the indicator tube presentation.

Deficiencies of the STC circuits previously used in efforts automatically to control receiver sensitivity in the interval between successively radiated pulses and the improved performance obtained with the present invention may be appreciated from the following discussion of FIGS. 2A–2D and from a subsequent discussion of FIGS. 2E and 2F in connection with a preferred embodiment of the invention shown in FIGURE 3.

Referring to FIGURE 2A, the successively radiated pulses P, P are of brief duration and periodically occur at relatively long intervals. By way of example, the pulse duration may be 1 microsecond and the interval T between successive pulses may be 1,000 microseconds. The gating signal G (FIG. 2B) for initiating the sweep cycle and for effecting visibility of the cathode-ray spot of indicator tube 53 starts simultaneously with termination of each radiated pulse P and continues for a fraction of interval T. The control means for varying the duration of gating pulse G between limits GS and GL is adjustable concurrently with known range-setting means, not shown.

The gating signal G is applied with negative polarity to the STC section 56 automatically to vary the sensitivity of the receiver-amplifier section 43 during the interval T. With prior sensitivity control arrangements having the typical characteristic O (FIG. 2C), the amplifier sensitivity or gain is at its maximum when a transmitter pulse is radiated. Then in response to the gating signal, the amplifier gain is reduced during the interval D and is then increased to a maximum level at which it is maintained for the remainder of the pulse interval T.

With such STC circuit (FIG. 2C), the amplifier gain is still close to its maximum during reception of strong echoes from nearby objects and so fails within the significant initial interval D to prevent overloading of the amplifiers 43, 55. The radar system so controlled fails to resolve nearby objects in the indicator tube presentation. In brief, a radar system having the time-sensitivity characteristic of curve O is effectively blinded within interval D of each sweep. This is particularly serious in navigation or search where for example it is sought to locate buoys, small disabled craft and the like under conditions of poor visibility. Since the delay interval D is of fixed duration, the unresolvable part of the indicator tube presentation becomes an increasingly higher percentage of the total presentation as the radar range is decreased in effort to locate small nearby objects. For the minimum sweep interval GS, nearly one-half or more of the sweep display is unresolved because of the relatively great duration of blind interval D.

It is further to be noted from FIGURE 2C that after the amplifier gain has been reduced to minimum level, it must increase rapidly to attain maximum level in the remaining effective fraction I of the sweep interval which terminates simultaneously with the gating signal G. The old STC characteristic O provides unnecessarily high amplification for echo signals from nearby objects when the maximum level is set for detection of remote objects and requires excessive manipulation of manual gain controls in efforts to obtain compromise sensitivity for the particular range setting being used.

It is also a characteristic of prior STC circuits that should the control-tube fail to conduct (because of heater burnout for example), the amplifier tubes are biased beyond cutoff, so rendering the radar system inoperative until the control-tube is replaced. Continued emergency operation under manual control is not feasible.

In accordance with method aspects of the present invention and as shown by typical characteristic N of FIGURE 2D, the amplifier gain is already at minimum level when a radiated pulse terminates and there is absent any initial interval of high gain and poor resolution corresponding with interval D of FIGURE 2C. Instead of falling and then rising, the amplifier gain (FIGURE 2D) begins to rise from minimum level preferably approximately coincidentally with termination of pulse P. Thus, the interval I, during which objects are resolved in the indicator tube presentation, starts substantially immediately upon termination of pulse P so affording resolution of closeby objects. This is of particular advantage in location of navigational aids, obstructions to navigation, disabled craft and the like whose presence is increasingly important as they are more closely approached in fog or under other conditions of poor visibility.

Also as shown in FIGURE 2D, the effective sweep-display interval I is always equal to the sweep cycle, whether it be long or short. This is in contrast to the effective sweep-display interval I of FIGURE 2C which becomes an increasingly smaller fraction of the sweep cycle as the gating signal G is shortened for reduced ranging. Thus, for any given level of final maximum gain, the characteristic N of FIGURE 2D affords better compensation for the decrease in echo signal strength with increase of distance to the reflecting objects.

As indicated by the three double-headed arrows of FIGURE 2D and as later described in connection with FIGURE 3, the minimum gain level, the maximum gain level, and the rate of change of gain between those levels may be respectively preset by the operator to values affording optimum echo presentation for the radar range in use at a particular time.

Also in accordance with the present invention, and as particularly pointed out in discussion of FIGURE 3, it is provided that in event of failure of the control tube, the receiver sensitivity assumes a preset level H (FIGURE 2D) which can be manually adjusted to a compromise value permitting continued emergency operation of the radar system.

In general, the improved STC circuit provides for at least one and preferably more amplifier stages, a negative biasing voltage B (FIGURES 2E, 2F) which has two independently derived components. One component (BH) is continuously supplied and determines the maximum sensitivity of the amplifier. The magnitude of this component may be adjusted by the operator to pre-select the maximum gain level. The other component (BL) is periodically supplied by means of an electronic switch controlled from the gating impulses G. The peak amplitude of this component may be adjusted by the operator to pre-select the minimum sensitivity of the amplifier. The rate of change of the second component (BL) is determined by a resistor-reactance network, whose time constant may be adjusted by the operator to pre-select the rate of change of amplifier gain between the two levels.

Referring to FIGURE 3, the resistor 77 which develops a biasing voltage having these two components is in the grid-return circuit of tube 71, exemplary of an amplifier tube in either of sections 43, 55 (FIGURE 1). The pulse echo signals are applied to the grid of tube 71 from the preceding stage or section by coupling capacitor 78A. A direct-current path from the upper or grid-end of the bias resistor 77 to the grid of tube 71 is afforded by inductor 76 which is of high impedance to the echo signals. The resistor 80, also included in this path, and the capacitor 82 which serves as a by-pass to resistors 80 and 77 for the echo signals provide a decoupling network effectively isolating the signal and bias circuits. The bias afforded by resistor 77 may be and preferably is similarly applied to other stages of amplifier 43 or 55, each having a decoupling network exemplified by 80A, 82A.

The grid-cathode circuit of tube 71 is completed by the cathode resistor 73 usually shunted by by-pass capacitor 74. A common cathode resistor for all stages of the amplifier may be used. The by-pass capacitor 75 connected between the screen and cathode of tube 71, the load resistor 72 connected between the anode of tube 71, the positive terminal B+ of the anode screen supply, and the capacitor 78B for coupling to the next stage or section are conventional and need not be further described.

As indicated in FIGURE 3, the lower ends of resistors 73 and 77 are connected to the receiver chassis which serves as a ground point or point of reference potential. To this same point is connected the positive terminal of a direct-current source 10A which continuously supplies current $I_1$ (solid arrow) to biasing resistor 77. For adjustment of the magnitude of this current and therefore of the bias component BH (FIGURES 2E, 2F), the source includes a potential-divider network having an adjustable contact or tap 91 connected to the grid end of the bias resistor 77. To limit the extent to which the maximum sensitivity of the amplifier may be reduced by the operator, a fixed resistor 94 is connected between the negative terminal of source 10A and the ungrounded end of potentiometer 92.

To provide the second component (BL) of the bias supplied by the STC section 56, an electronic switch 83 is connected in circuit between the grid end of bias resistor 77 and a direct-current source 10B having its positive terminal grounded. Thus when the switch is made conductive, an additional current $I_2$ (dotted arrow) flows through resistor 77 to increase the negative bias applied to the amplifier tube or tubes. The rate at which this current-component changes upon transitions between conductive and non-conductive states of the switch 83 is determinable by the time constant of the resistance-capacitance network 96, 98 effectively in shunt to bias resistor 77.

In the preferred embodiment shown in FIGURE 3, the electronic switch is a triode 83 having its anode connected to the grid end of bias resistor 77 through potentiometer 98 and also to the contact 91 of the sensitivity control 92 through potentiometer 98 and resistor 95. For reasons which later appear, the resistance of resistor 95 is much greater than the resistance of bias resistor 77. The grid of control tube 83 is connected to its cathode through a high resistance grid-leak 90. During application of a negative gating signal G to the grid through coupling capacitor 97, the grid is at high negative potential with respect to the cathode, and tube 83 is non-conductive.

Upon termination of gating pulse G, the tube 83 becomes conductive. In absence of capacitor 96, the component $I_2$ of the bias resistor current would immediately assume its maximum negative value and produce minimum amplifier sensitivity. However, with capacitor 96 in circuit, the rate at which the anode of tube 83 can approach its maximum steady-state potential corresponding with the peak value of current $I_2$ is dependent upon the setting of contact 99. This delay in attainment of maximum bias or minimum receiver sensitivity is of no consequence since it occurs while the cathode spot of the indicator tube 53 is not visible. By selection of the value of capacitor 96 and/or resistance 98, such delay is less than the fraction of the pulse interval T remaining after termination of the longest gating pulse GL (FIGURE 2B).

Upon initiation of a negative gating pulse G, the switch tube 83 becomes non-conductive, but the discharge of capacitor 96 through bias resistor 77 temporarily continues to supply it with current $I_2$. The magnitude of this component, however, decreases with time at a rate depending upon the slope-control setting of contact 99 so that the receiver gain rises exponentially throughout the sweep display interval. For adjustment of the magnitude of the periodic component BL of the bias produced by flow of current $I_2$ through resistor 77, the source 10B is provided with a potential-divider network having an adjustable contact or tap 86 connected to the cathode of tube 83. To limit the extent to which an operator may preset the maximum negative value of bias component BL (in minimum amplifier sensitivity), a fixed resistor 89 is connected between the negative terminal of bias source 10B and the ungrounded end of potentiometer 87.

The bias sources 10A, 10B may be combined in a single primary source for supplying current to both of the divider networks 92, 94, and 87, 89, which in turn respectively supply currents 11, 12 to the bias resistor 77. In either case, the magnitudes of the two bias components $I_1$ and $I_2$ can be independently preset by adjustment of the potentiometer contacts 91, 86. Undesired excessive interlocking of the effects of these adjustments upon receiver gain is avoided by inclusion of the high resistance 95 in circuit between the grid end of bias resistor 77 and the potentiometer contact 91.

In the following Table I, suitable circuit values used in the preferred embodiment of FIGURE 3 are given.

*Table I*

Resistors:
| | | |
|---|---|---|
| 72 | ohms | 2,000 |
| 73 | do | 150 |
| 77 | do | 1,000 |
| 80, 80A | do | 200 |
| 87 | do | 5,000 |
| 89 | do | 25,000 |
| 90 | do | 470,000 |
| 92 | do | 25,000 |
| 94 | do | 24,000 |
| 95 | do | 12,000 |
| 98 | do | 5,000 |

Capacitors:
| | | |
|---|---|---|
| 74 | mmf | 1,000 |
| 75 | mmf | 1,000 |
| 78 | mmf | 100 |
| 82, 82A | mmf | 470 |
| 96 | mf | 0.01 |
| 97 | mf | 0.01 |

Tubes:
| | |
|---|---|
| 71 | 5654 |
| 83 | 5687 (1 section) |

Voltages:
| | | |
|---|---|---|
| B+, B− | volts | 150 |
| C+, C− | do | 300 |
| G | do | −100 |

As illustrative of the flexibility of operation afforded by the preferred STC circuit of FIGURE 3, reference is made to FIGURES 2E and 2F.

To preset the system for display of echoes from remote objects in long-range searching, the receiver-sensitivity-control contact 91 is set toward the grounded end of potentiometer 92 so that the constant bias component BH (FIGURE 2E) is relatively small. To insure that the amplifier gain is sufficiently low to avoid overloading by early strong echoes from close-by objects, the contact 86 of the STC amplitude control is set toward the ungrounded end of potentiometer 87. For such setting, the peak value of the periodic bias component BL (FIGURE 2E) is high. To obtain a suitable rate of increase of sensitivity throughout the relatively long display interval IL (FIGURE 2E), the slope-control contact 99 is set toward the anode end of potentiometer 98.

To adjust the STC for optimum echo display in short-range searching, the sensitivity contact 91 is shifted toward the ungrounded end of potentiometer 91 to provide a constant bias component BH (FIGURE 2F) which is relatively large and magnitude-control contact 86 is shifted toward the grounded end of potentiometer 87 so that the peak value of periodic bias component BL (FIGURE 2F) is relatively small. The time constant of network 96, 98 is suitably shortened by shifting contact 99 away from the anode end of potentiometer 98 so that the desired low maximum sensitivity is attained in the relatively short echo display IS (FIGURE 2B).

For all adjustments of these controls, the receiver sensitivity is at the preselected minimum level before occurrence of each radiated pulse peak; it begins rising from that minimum level from the very start of the echo-display sweep and rises toward the preselected maximum at a preselected rate.

Reverting to FIGURE 3, it is apparent that should the tube 83 fail to conduct, as because of burn-out of heater F, the receiver sensitivity remains at the level determined by the fixed bias component BH. Thus in event of control-tube failure, continued emergency operation of the radar system is possible by adjustment of contact 91 to a compromise position of receiver sensitivity.

What is claimed is:

1. In a radar system having a receiver and a cathode-ray display tube, an arrangement effective to decrease the receiver sensitivity to a preset minimum before the beginning of each sweep of the display tube and effective upon initiation of of each sweep exponentially to increase the receiver sensitivity to a preset maximum comprising biasing-resistance means in the grid-cathode circuit of one or more tubes of the receiver, a control tube having its anode connected to the grid terminal of said biasing-resistance means, a current supply means having positive and negative terminals respectively connected to the cathode terminal of said biasing-resistance means and to the cathode of said control tube, said source being adjustable to preset the minimum sensitivity of the receiver, means for applying to the grid of said control tube negative gating pulses coincident with successive sweeps of the display tube, a resistance-capacitance network effectively in shunt to said biasing-resistance means and having an adjustable time-constant to preset the rate of change of receiver sensitivity, and a second current-supply means having positive and negative terminals respectively connected to the cathode and grid terminals of said biasing-resistance means and adjustable to preset the maximum sensitivity of the receiver.

2. An arrangement for varying the sensitivity of an amplifier between preset minimum and maximum values comprising biasing-resistance means in the grid-cathode circuit of one or more amplifier tubes; means for presetting the maximum sensitivity of the amplifier comprising a first potentiometer having its positive terminal and its adjustable contact respectively connected to the cathode and grid terminals of said resistance means; means for presetting the minimum sensitivity of the amplifier comprising a control tube having its anode connected to the grid terminal of said resistance means, and a second potentiometer having its positive terminal and its adjustable contact respectively connected to the cathode terminal of said resistance means and to the cathode of said control tube; and means for applying a negative control potential to the grid of the control tube to effect amplifier operation at said preset maximum sensitivity and for discontinuing application of said potential to effect amplifier operation at said preset minimum sensitivity.

3. An arrangement as in claim 2 additionally including means for preselecting the rate of change of amplifier sensitivity upon application and discontinuance of said control potential comprising a third potentiometer having its terminals respectively connected to the anode of said control tube and to the grid terminal of said resistance means, and a capacitor connected between an adjustable contact of said third potentiometer and the cathode terminal of said resistance means.

4. A sensitivity-time-control circuit for a pulse-echo system wherein pulses are successively transmitted and received, said system including a receiver having gain control means including a gain control resistor so connected that the gain of the receiver is reduced when current flows through said resistor in a certain direction, a switching device so connected that current flowing through said device also flows through said resistor and in said certain direction to reduce said gain, a capacitor connected to receive a charge when said switching device is conducting and also connected to discharge current through said resistor in said certain direction when said switching device is non-conducting, and means for rendering said switching device non-conducting at approximately the instant a pulse is transmitted and for holding said device non-conducting for a substantial portion of the period between successive pulses, whereby, during said portion, said discharge current flows through said resistor with gradually decreasing value so that said gain gradually increases.

5. A pulse-echo system comprising means for producing and radiating pulses of energy toward an object, means for receiving pulses of energy from said object in response to said radiation, a cathode ray tube, means for applying said received pulses to said cathode ray tube, means for producing a gating pulse in timed relation to said pulse radiation, means for applying to said cathode ray tube a time sweep wave having approximately the duration of said gating pulse, said receiving means having gain control means including a gain control resistor so connected in said receiving means as to reduce the gain of said receiving means when current flows through said resistor in a certain direction, a switching device through which current flows in the absence of a gating pulse being applied thereto and which is so connected that the current flowing therethrough also flows through said gain control resistor in said certain direction, and means for applying said gating pulse to said switching device to make it non-conducting substantially for the duration of said gating pulse, and a capacitor connected to be charged while said switching device is conducting current, said capacitor also being connected to discharge through said gain control resistor in said certain direction whereby the gain of said receiving means gradually increases as the value of said discharge current decreases.

6. A pulse-echo system comprising means for producing and radiating pulses of energy toward an object, means for receiving pulses of energy from said object in response to said radiation, a cathode ray tube, means for applying said received pulses to said cathode ray tube, means for producing a gating pulse in timed relation to said pulse radiation, means for applying a time sweep wave to said cathode ray tube in response to and substantially for the duration of said gating pulse, a switching device through which a certain maximum value of current may flow, gain control means for controlling the gain of said receiving means as a function of the current flowing through said switching device, said gain control means including a resistor through which said current flows, said gain being a minimum when said current flow is a maximum, and means for applying said gating pulse to said switching device to make it non-conducting for the duration of said gating pulse, and a capacitor connected to be charged while said switching device is conducting current, said capacitor also being connected to discharge through said gain control resistor after said switching device becomes non-conducing with the discharge current flowing through said resistor in the same direction as that of the current supplied through the switching device whereby the gain of said receiving means gradually increases as the value of said discharge current decreases.

7. A pulse-echo system comprising means for producing and radiating pulses of energy toward an object, means for receiving pulses of energy from said object in response to said radiation, said receiving means including a resistive device and including an amplifier the gain of which may be varied as a function of current flow through said device, means for producing a gate pulse at approximately the same time a pulse is transmitted, a capacitor, means including a switching device for charging said capacitor and for simultaneously reducing said gain in response to the termination of said gate pulse and for holding said gain at a minimum during the interval immediately prior to the transmission of a pulse, and means for discharging said capacitor through said device and thereby causing the gain of said amplifier to gradually increase in response to the application of said gate pulse to said switching device.

8. A pulse-echo system comprising means for producing and radiating pulses of energy toward an object, means for receiving pulses of energy from said object in response to said radiation, said receiving means including a resistive device and including an amplifier the gain of which may be varied as a function of current flow through said device, means for producing a gate pulse at approximately the same time a pulse is transmitted, said gate pulse having a duration substantially equal to the portion of the time interval between successive pulse transmissions that said receiving means is to be in condition to receive pulses, a capacitor, means including a switching device for charging and capacitor and for simultaneously reducing said gain in response to the termination of said gate pulse and for holding said gain at a minimum during the interval immediately prior to the transmission of a pulse, and means for discharging said capacitor through said device and thereby causing the gain of said amplifier to gradually increase in response to the application of said gate pulse to said switching device.

References Cited in the file of this patent

UNITED STATES PATENTS

| | | |
|---|---|---|
| 2,498,381 | Smith | Feb. 21, 1950 |
| 2,602,922 | Maynard et al. | July 8, 1952 |
| 2,679,589 | Mack | May 25, 1954 |
| 2,757,284 | Hutchinson | July 31, 1956 |

FOREIGN PATENTS

| | | |
|---|---|---|
| 472,933 | Canada | Apr. 17, 1951 |